United States Patent [19]

Adler et al.

[11] Patent Number: 5,174,008

[45] Date of Patent: Dec. 29, 1992

[54] METHOD OF ASSEMBLING PRESSURE PLATE UNITS OF MOTOR VEHICLE FRICTION CLUTCHES

[75] Inventors: Manfred Adler, Schwebheim; Ludwig Eberlein, Sulzthal; Dieter Kolb, Bad Kissingen; Peter Eichelsberger, Dittelbrunn; Alfred Meyer, Schweinfurt; Kurt Schäfer, Schweibheim; Erich Stark, Arnstein-Gänheim; Willi Trux, Grettstadt; Erich Scheer, Prosselsheim; Hans-Joachim Rothe, Schweinfurt, all of Fed. Rep. of Germany

[73] Assignee: Fichtel & Sachs, Schweinfurt, Fed. Rep. of Germany

[21] Appl. No.: 850,415

[22] Filed: Mar. 12, 1992

[30] Foreign Application Priority Data

Mar. 13, 1991 [DE] Fed. Rep. of Germany ....... 4107949

[51] Int. Cl.⁵ ............................................. B23Q 17/00
[52] U.S. Cl. ......................................... 29/404; 29/407
[58] Field of Search ................................... 29/404, 407

[56] References Cited

U.S. PATENT DOCUMENTS

| | | | |
|---|---|---|---|
| 2,189,956 | 2/1940 | Kurzina, Jr. ..................... | 29/404 X |
| 2,797,472 | 2/1957 | Kosche ............................. | 29/404 |
| 3,750,251 | 8/1973 | Pugh et al. ...................... | 29/404 X |
| 3,952,460 | 4/1976 | Clements ......................... | 29/404 X |

Primary Examiner—Timothy V. Eley
Attorney, Agent, or Firm—Anderson Kill Olick & Oshinsky

[57] ABSTRACT

To enable prescribed functional values of pressure plate units of motor vehicle friction clutches to be observed with smaller tolerances than hitherto, it is proposed that a housing-spring component initially be pre-assembled from clutch housing (1) and diaphragm spring (7) and that this component be measured together with a master pressing plate. Geometry (diameter 25 and axial height 27) which is optimum for minimum tolerances of a contact bevel 15 is calculated by means of the measured result, and a pressing plate (13) with this bevel geometry is produced. The measured spring-housing component is finally assembled together with this specially produced pressing palte 913).

3 Claims, 1 Drawing Sheet

METHOD OF ASSEMBLING PRESSURE PLATE UNITS OF MOTOR VEHICLE FRICTION CLUTCHES

BACKGROUND OF THE INVENTION

The invention relates to a method of assembling pressure plate units of motor vehicle friction clutches in which a clutch housing is initially combined with a diaphragm spring serving as a clutch main spring to form a housing-spring component, and a pressing plate resting on the diaphragm spring in the operating position with a contact bevel then mounted on the housing-spring component.

During the assembly of pressure plate units, the production tolerances of the individual parts add up to great divergence in the functional values of the finally assembled pressure plate unit. As, on the other hand, the functional values of the pressure plate unit and, in particular, its pressing force disengagement path characteristic has to be observed with comparatively low tolerances for regular operation of the friction clutch, conventional methods of assembly often lead to waste and the finally assembled pressure plate units have to be reworked.

The invention is to provide a method of assembling pressure plate units of motor vehicle friction clutches with which the proportion of pressure plate units, which are useless or have to be reworked, is as low as possible.

SUMMARY OF THE INVENTION

The invention is based on the fact that the pressing force disengagement path characteristic or the disengagement force disengagement path characteristic, in particular, have to be maintained in particularly close tolerance limits in pressure plate units of motor vehicle friction clutches. The mechanical transmission ratios in the pressure plate unit can be altered by varying the contact bevel of the pressing plate, i.e. by varying the axial height and/or the diameter of the contact bevel such that the force-path characteristic can be adapted to the required values in most cases. The invention exploits this idea in that the housing-spring component previously assembled from the clutch housing and the diaphragm spring, is measured prior to assembly of the pressing plate together with a master pressing plate, with a contact bevel of defined shape, and in that the contact bevel of the pressing plate to be assembled is then machined as a function of the result of measurement such that the required properties of the pressure plate unit are achieved after assembly of the machined pressing plate. The housing-spring component already comprises the majority of the individual plate of the pressure plate unit, i.e. the clutch housing, the diaphragm spring and the components required for assembly of the diaphragm spring, such as spacer bolts and wire coils. The total tolerances of the housing-spring component are detected during measurement of the housing-spring component with the master pressing plate, which is inserted into the housing-spring component solely for the purpose of measurement and is shaped according to the dimensions, i.e. the desired dimensions. With knowledge of the total tolerances, it is possible to determine, for example, by a computer-assisted optimisation process, the diameter and the axial height of the contact bevel for a pressing plate, which in combination with the measured housing-spring component yield optimum functional values of the pressure plate unit. A pressing plate having the contact bevel shape, which is found to be optimum is then produced for each individually measured housing-spring component, for example on an NC-lathe of an automatic interlinked production plant and is fitted into the associated housing-spring component.

The finally assembled pressure plate unit is preferably finally measured again in order to detect the tolerances of the last production stages. In a preferred variation, the results of the final measurement are fed back to the computer carrying out optimisation of the contact bevel such that the machining of the next pressing plate can be corrected, if necessary, as a function of the measurement of the previously assembled pressure plate unit.

The method according to the invention has the advantage that prescribed functional values of pressure plate units can be maintained more uniformly, i.e. with less deviation, so more critical quality requirements can also be satisfied. Waste and reworking of finally assembled pressure plate units are substantially avoided. A further advantage is that individual parts lying in certain limits outside the predetermined tolerances can also be fitted as this exceeding of tolerances can be compensated by altering the contact bevel of the pressing plate. Optimisation of the pressing plate during assembly allows the force values of the pressure plate unit to be altered very quickly and without numerous checks, for example, at the request of a customer. This is also advantageous in the new development of pressure plate units.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is described in more detail hereinafter with reference to drawings.

DESCRIPTION OF PREFERRED EMBODIMENTS

Figure 1:
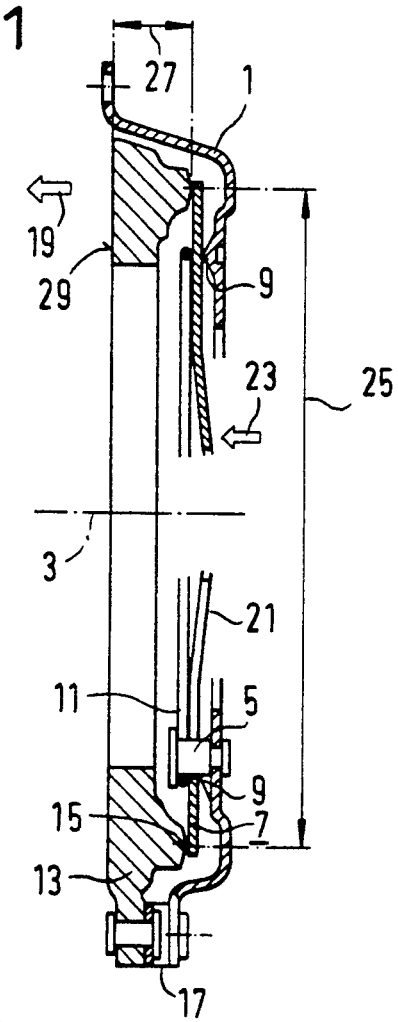
FIG. 1 is an axial longitudinal section through a pressure plate unit of a motor vehicle friction clutch.

The finally assembled pressure plate unit shown in FIG. 1 comprises a clutch housing 1 to be mounted in the conventional manner on a flywheel not shown in detail, a diaphragm spring 7 being mounted, so as to be tiltable between an annular bevel 9 of the clutch housing 1, and a wire coil 11 commonly surrounding the spacer bolts 5 on the clutch housing 1, by means of spacer bolts 5 arranged in a circle round an axis of rotation 3 of the clutch. The clutch housing 1 surrounds a pressing plate 13 which rests with a contact bevel 15 on the diaphragm spring 7 with radial spacing from the circular arrangement of the spacer bolts 5. The pressing plate 13 is non-rotatably but axially-movably guided on the clutch housing 1 in the conventional manner, by means of tangential leaf springs 17, in this case.

During operation of the clutch the diaphragm spring 7 tensioning the pressing plate 13 with a pressing force 19 via friction linings of a clutch disk (not shown) against the flywheel. The pressing plate 13 can be released and the clutch disengaged by means of a disengagement force 23 exerted on spring tongues 21 of the diaphragm spring 7. The pressing force 19 and the disengagement force 23 must follow the disengagement path of the disengagement member or the spring tongues 21 within comparatively close tolerance limits according to a predetermined force-path characteristic. The force-path characteristic is influenced by the tolerances of the clutch housing 1, the diaphragm spring 7 and its fastening members 5, 9, 11 as well as the pressing plate 13. The mechanical transmission ratio of the pressure plate unit can be altered by varying the diameter 25 of the contact bevel 15 and the axial spacing 27 between the contact bevel 15, and the frictional face 29 of the pressing plate 13 such that the predetermined tolerance limits of the force-path characteristic can be observed.

Figure 2:
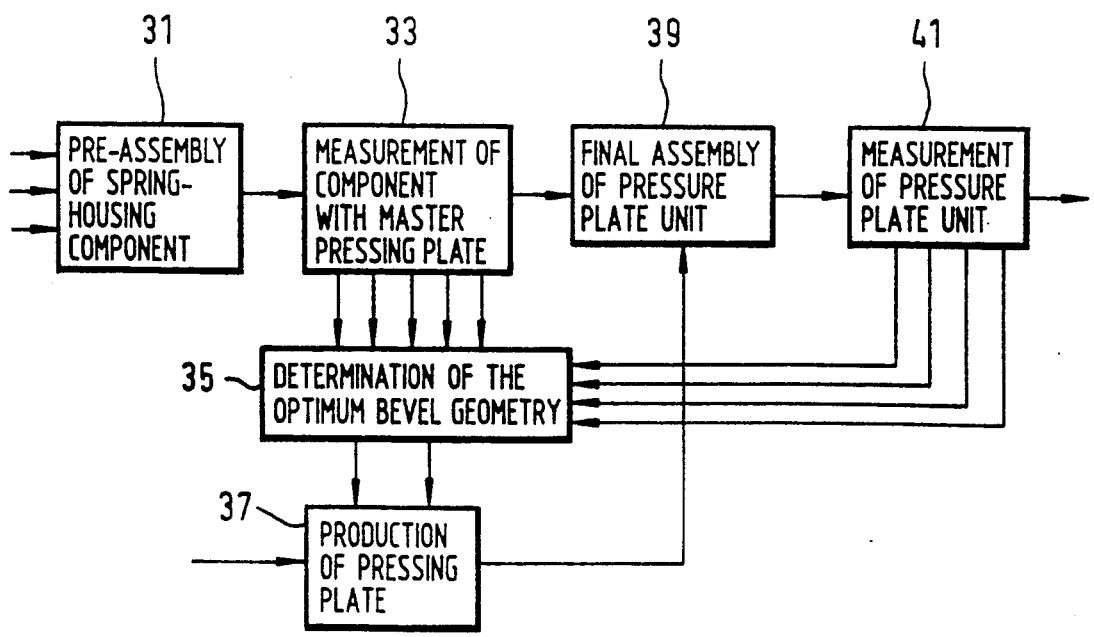
FIG. 2 is a schematic flow diagram of the method according to the invention for the assembly of pressure plate units.

To allow serial production of the pressure plate unit with minimum waste and with minimum tolerance deviations, the flow diagram in FIG. 2 is followed during assembly. In a first step 31, the diaphragm spring 7, the spacer bolts 5, the wire coil 11 and the clutch housing 1 are combined to form a spring-housing component. In a second step 33, the spring-housing component is measured together with a master pressing plate (not shown in detail). The master pressing plate corresponds to the pressing plate 13 from FIG. 1 and has the dimensions forming the basis of the pressure plate unit. The values of the diameter 25 and the axial spacing 27 of the pressing plate-contact bevel 15, for which the deviation in the functional values of the spring-housing component, measured in step 33 from the desired functional values, would be minimal, are determined in a step 35, for example, by means of an optimisation computing process, depending on the result of measurement step 33, if a pressing plate with these dimensions would be fitted. The contact bevel 15 of a pressing plate 13 which is finished apart from its contact bevel is then produced in a step 37, for example by turning on an NC-lathe having the dimensions 25, 27 determined in step 35. In a step 39, the pressing plate 13 produced in step 37 is fitted into the spring-housing component measured in step 33, and the pressure plate unit is finally assembled. The finally assembled pressure plate unit is measured again in step 41 in order to detect the tolerances of the last production steps. The result of measurement step 41 is fed back to the computing step 35 determining the optimum bevel geometry so that the computing step 35 can be improved if necessary.

While specific embodiments of the invention have been shown and described in detail to illustrate the application of the inventive principles, it will be understood that the invention may be embodied otherwise without departing from such principles.

What we claim is:

1. A method of assembling pressure plate units of motor vehicle friction clutches comprising the steps of:
   (a) initially combining a clutch housing with a diaphragm spring serving as a clutch main spring to form a housing-spring component;
   (b) mounting a pressing plate on the housing-spring component, the pressing plate resting on the diaphragm spring with a contact bevel in the operating position;
   the improvement comprising:
   (c) measuring the housing-spring component before assembly of the pressing plate together with a master pressing plate having a contact bevel of defined shape;
   (d) machining the contact bevel of the pressing plate to be assembled according to the result of said measurement; and
   (e) mounting the machined pressing plate on the housing-spring component according to step b.

2. A method of assembling pressure plate units of motor vehicle friction clutches, comprising the steps of:
   (a) initially combining a clutch housing with a diaphragm spring serving as a clutch main spring to form a housing-spring component;
   (b) mounting a pressing plate on the housing-spring component, the pressing plate resting on the diaphragm spring with a contact bevel, having a diameter, in the operating position;
   (c) measuring the housing-spring component before assembly of the pressing plate together with a master pressing plate having a contact bevel of defined shape;
   (d) machining the contact bevel of the pressing plate to be assembled according to the result of said measurement;
   (e) mounting the machined pressing plate on the housing-spring component according to step b; and
   (f) adjusting the diameter of the contact bevel and/or the axial height of the contact bevel by machining the pressing plate to be assembled.

3. The method of claim 2, further comprising the steps of:
   measuring again the assembled pressure plate unit; and
   correcting the machining of the next pressing plate as a function of the measurement of the previously assembled pressure plate unit.

* * * * *